United States Patent [19]

Fukui et al.

[11] Patent Number: 4,760,878

[45] Date of Patent: Aug. 2, 1988

[54] PROCESS FOR PRODUCING HEAT PIPE

[75] Inventors: Koichiro Fukui; Yuichi Furukawa; Kazunari Noguchi, all of Sakai, Japan

[73] Assignee: Showa Aluminum Corporation, Osaka, Japan

[21] Appl. No.: 938,191

[22] Filed: Dec. 5, 1986

[30] Foreign Application Priority Data

Dec. 13, 1985 [JP] Japan .............................. 60-281694
Dec. 13, 1985 [JP] Japan .............................. 60-281695

[51] Int. Cl.$^4$ ........................ F28D 15/02; F28F 19/02
[52] U.S. Cl. ............................... 165/104.27; 165/133; 427/229; 427/239
[58] Field of Search ................ 165/134.1, 104.27, 133; 427/239, 229

[56] References Cited

FOREIGN PATENT DOCUMENTS

| 151882 | 11/1981 | Japan | 165/104.27 |
| 151883 | 11/1981 | Japan | 165/104.27 |
| 168089 | 12/1981 | Japan | 165/104.27 |
| 23794 | 2/1982 | Japan | 165/104.27 |

Primary Examiner—Albert W. Davis, Jr.
Attorney, Agent, or Firm—Armstrong, Nikaido, Marmelstein & Kubovcik

[57] ABSTRACT

A process for producing a heat pipe including the steps of treating the inner surface of a steel container with an aqueous solution of a vanadate with heating, and enclosing in the container a working liquid prepared by adding an alkalinizing pH adjusting agent to pure water and having an adjusted pH of 8 to 12. When the container inner surface is treated with the aqueous vanadate solution with heating, a protective layer covering the inner surface is formed. The working liquid, when in the range of 8 to 12 in pH, maintains the protective layer in a stable state over a prolonged period of time.

9 Claims, 1 Drawing Sheet

PROCESS FOR PRODUCING HEAT PIPE

BACKGROUND OF THE INVENTION

The present invention relates to a process for producing a heat pipe comprising a steel container having water enclosed therein as a working liquid.

Heat pipes comprising a steel container having water enclosed therein as a working liquid are in wide use because of the high strength of the container and the superior characteristics of water as the working liquid. However, such heat pipes have the problem that iron reacts with water to evolve hydrogen gas, impairing the performance of the heat pipe in a short period of time. More specifically, the evolved hydrogen gas diffuses through the wall of the steel container in the form of atoms and becomes partly released from the container at a constant rate, but a major portion of the hydrogen gas remains in the condensing portion within the container to lower the performance of the heat pipe. While the steel container is sometimes aluminized over the outer surface to provide protection against corrosion and also to attach thereto aluminum fins having a brazing layer by vacuum brazing, the hydrogen gas diffusing through the container wall is then prevented from escaping from the container by the resulting aluminized coating.

Accordingly, the following means have heretofore been employed to prevent the evolution of hydrogen gas and to preclude deterioration of the heat pipe due to the evolution of hydrogen gas.

(1) Addition of an inhibitor to the working liquid, i.e. water, to inhibit the reaction between water and iron.

(2) Copper plating of the inner surface of the steel container.

(3) Provision of a hydrogen absorbing material within the container.

(4) Provision of a linear hydrogen passing member of Pd or the like for holding the interior of the container in communication with the outside.

These means nevertheless fail to inhibit hydrogen gas and to prevent deterioration of the heat pipe due to the evolved hydrogen gas when the pipe is used for a prolonged priod of time.

SUMMARY OF THE INVENTION

The main object of the present invention is to overcome the foregoing problems and to provide a process for producing a heat pipe which remains free of deterioration over a prolonged period of time.

The present invention provides a process for producing a heat pipe comprising the steps of treating the inner surface of a steel container with an aqueous solution of a vanadate with heating to form a protective layer over the container inner surface, and thereafter enclosing in the container a working liquid prepared by adding an alkalinizing pH adjusting agent to pure water and having an adjusted pH of 8 to 12.

With the process of the present invention, a protective layer is formed over the inner surface of a container by treating the container inner surface with an aqueous solution of a vanadate with heating, so that the protective layer is made of at least one of chemically stable oxides such as $VO_2$, $V_2O_3$, $Fe_2O_3$ and $Fe_3O_4$, has a compact structure and achieves an outstanding protective effect against corrosion, consequently inhibiting hydrogen gas due to the reaction between water and Fe and the deterioration of the heat pipe due to evolved hydrogen gas. Furthermore, a working liquid prepared by adding an alkalinizing pH adjusting agent to pure water and having an adjusted pH of 8 to 12 is enclosed in the container internally formed with the protective layer, thereby passivating Fe and V and rendering $VO_2$, $V_2O_3$, $Fe_2O_3$, $Fe_3O_4$ or the like stable. This inhibits evolution of hydrogen gas and corrosion over a prolonged period of time, giving a heat pipe which is serviceable free of deterioration over a long period of time.

DESCRIPTION OF THE PREFERRED EMBODIMENTS

Figure 1:
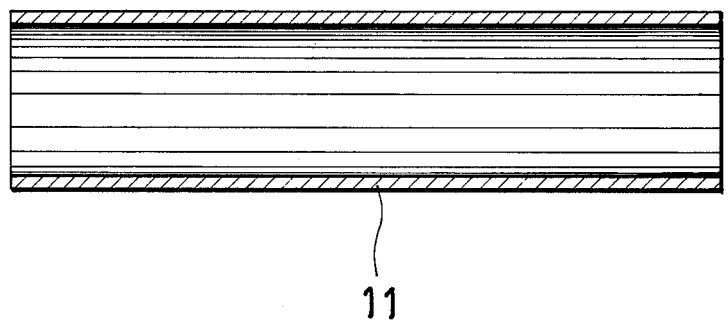
FIG. 1 is a view in longitudinal section showing a pipe for preparing a container.

The vanadate to be used usually for the process of the present invention is ammonium metavanadate, sodium metavanadate, potassium metavanadate or the like, although these examples are not limitative. Among these vanadates, ammonium metavanadate which is free from alkali metal is desirable to use. The aqueous vanadate solution preferably contains 0.1 to 5 wt. %, more preferably 0.3 to 0.7 wt. %, of vanadate. When less than 0.1 wt. % in the concentration, the solution fails to form a protective layer of sufficient thickness, whereas concentrations exceeding 5 wt. % will not achieve a greatly improved effect but result in an increased cost. The aqueous vanadate solution may be prepared by dissolving a vanadate in pure water such as ion-exchanged water, or may be one prepared in a container for the heat pipe by placing the vanadate into the container and thereafter placing ion-exchanged water or like pure water. The amount of the aqueous vanadate solution to be placed into the container is preferably such that the solution will fill up the container upon expansion when heated. A uniform protective layer can then be formed over the entire inner surface of the container. It is thought that the protective layer formed is made of at least one of $V_2O_3$, $VO_2$, $Fe_2O_3$, $Fe_3O_4$, etc.

The heat treatment is conducted at a temperature of at least 160° C., preferably at such a temperature that no cracks will develop in the protective layer during the use of the heat pipe. A satisfactory protective layer will not be formed at temperatures of lower than 160° C., although the temperature is not limitative. The heat treatment temperature and time are suitably determined in view of the kind and concentration of the vanadate, the temperature range in which the resulting heat pipe is to be used, etc.

The working liquid to be used is adjusted to a pH of 8 to 12 by adding an alkalinizing pH adjusting agent to pure water since Fe and V are passive and $VO_2$, $V_2O_3$, $Fe_2O_3$, $Fe_3O_4$, etc. are stable in this pH range, such that no reaction occurs between Fe and water, or the protective layer will not become unstable in this pH range even when the heat pipe is used for a prolonged priod of time. Preferably, the working liquid has an adjusted pH of 8.5 to 10.5. The working liquid is enclosed in the container in an amount of about 20 to about 30% of the interior volume of the container.

Although not limitative, the alkalinizing pH adjusting agent to be used is preferably free from any alkali metal or alkaline earth metal for the following reason. An alkalinizing pH adjusting agent containing an alkali metal or alkaline earth metal, such as NaVO$_3$, if used, reacts with Fe to form a coating of Fe, V and O in mixture, consequently consuming VO$_3^-$ and leaving Na. It is then likely that the protective layer will dissolve at a higher pH to permit a reaction to produce hydrogen gas. Examples of useful alkalinizing pH adjusting agents are hydrazine, morpholine, triethanolamine and like amine compounds, and ammonia, among which hydrazine (N$_2$H$_4$) is especially preferable to use. Hydrazine, if used, reduces the amount of O$_2$ dissolved in pure water to greatly stabilize the protective layer on the inner surface of the container.

Before the working liquid is enclosed in the container formed with the protective layer, it is desirable to treat the container inner surface with an aqueous solution of hydrogen peroxide with heating for the prevention of corrosion. This enhances the corrosion inhibitory effect afforded by the protective layer formed by the heat treatment with use of an aqueous vanadate solution. Presumably, the reason will be as follows although still remaining to be fully clarified. When the protected container inner surface is further treated with an aqueous solution of hydrogen peroxide for the prevention of corrosion, the chemically stable VO$_3$, VO$_2$, Fe$_2$O$_3$ or Fe$_3$O$_4$ forming the protective layer grows, and Fe$_2$O$_3$ or Fe$_3$O$_4$ is further freshly formed to improve the corrosion inhibitory effect of the protective layer. The concentration of the aqueous hydrogen peroxide solution is preferably 0.1 to 34 wt. %, more preferably 1 to 5 wt. %. If the concentration is less than 0.1 wt. %, a satisfactory effect will not be available, whereas concentrations exceeding 34 wt. % will not achieve a noticeably improved effect and are therefore costly. The heating temperature is at least 160° C. and is preferably such that no cracks will develop in the protective layer during the use of the heat pipe. If the temperature is lower than 160° C., a satisfactory result will not be obtained. The treating time is determined suitably in view of the kind and concentration of vanadate used for forming the protective layer, the temperature range in which the heat pipe produced is to be used, the thickness of the protective layer formed, etc. The aqueous hydrogen peroxide solution is used preferably in such an amount that the solution will fill up the container on expansion when heated. The entire protective layer formed using an aqueous vanadate solution can then be uniformly treated for the prevention of corrosion.

Figure 2:
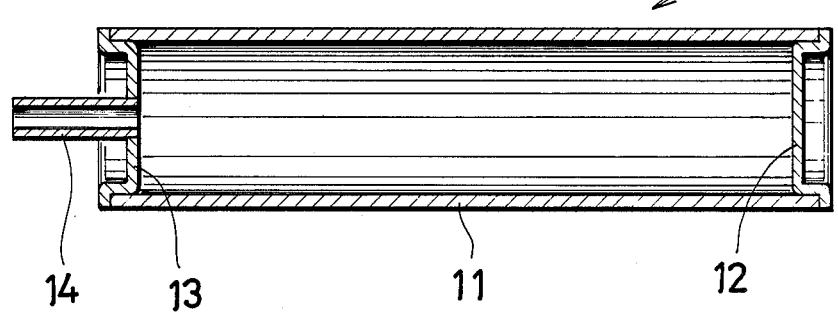
FIG. 2 is a view in longitudinal section showing the container.

The process of the present invention will be described below with reference to the drawings. A steel pipe 11 as shown in FIG. 1 is prepared, and an end cap 12 is welded to one end of the pipe to close the open end. The interior of the pipe 11 is then fully cleaned to remove scale. Subsequently, an end cap 13 having a nozzle 14 is welded to the other end of the pipe 11, whereby a heat pipe container 10 is prepared as shown in FIG. 2. The inner surface of the container is treated with an aqueous vanadate solution while heating the container 10. A working liquid prepared by adding an alkalinizing pH adjusting agent to pure water and having an adjusted pH of 8 to 12 is thereafter placed into the container 10 through the nozzle 14. The nozzle 14 is then closed. Thus, a heat pipe is produced.

EXAMPLE 1

A pipe made of STB35 and prescribed in JIS (Japanese Industrial Standards) G3461 was prepared which was 3000 mm in length, 31.8 mm in diameter and 4.5 mm in wall thickness. An end cap was welded to one end of the pipe to close the end. The inner surface of the pipe was then fully cleaned with an aqueous solution of monoammonium citrate having a concentration of 5 wt. % to remove scale. A cap having a nozzle was thereafter welded to the other end of the pipe to obtain a heat pipe container. An aqueous solution containing 0.5 wt. % of ammonium metavanadate was injected into the container through the nozzle in such an amount as to fill 70% of the entire interior volume of the container. With a valve mounted on the nozzle, the container was heated to deaerate the interior by driving out vapor therefrom, and the valve was then closed. Subsequently, the container was uniformly heated in its entirety and maintained at 300° C. for 4 hours to form a protective layer. The valve was thereafter opened to draw off the whole ammonium metavanadate solution from the container. After cooling the container, a working liquid prepared by admixing N$_2$H$_4$ with pure water and having an adjusted pH of 9.5 was injected into the container to fill 20% of the entire interior volume thereof. The interior was then deaerated by driving out vapor, and the valve was thereafter closed. Thus, a heat pipe was prepared. To check the heat pipe for performance, the evaporator portion of the pipe was heated to 280° C. by an electric heater while cooling the condenser portion thereof with running water. In this state, the temperature difference ($\Delta T$) between the evaporator portion and the condenser portion was measured. The amount of heat transport was maintained at 4000 W at all times. Consequently, the temperature difference ($\Delta T$) after lapse of 2000 hours was found to be about 0° C.

EXAMPLE 2

A heat pipe was prepared under the same conditions as in Example 1 with the exception of cooling the container after running off the aqueous solution of ammonium metavanadate before injecting the working liquid, then injecting an aqueous solution of hydrogen peroxide having a concentration of 3 wt. % into the container to fill 70% of the entire interior volume thereof, thereafter heating the container, closing the valve after deaerating the container by driving out vapor, subsequently uniformly heating the entire container at 300° C. for 2 hours, opening the valve to completely run off the hydrogen peroxide solution from the container and cooling the container. The heat pipe was checked for performance under the same conditions as in Example 1. Consequently, the temperature difference ($\Delta T$) after lapse of 2000 hours was found to be about 0° C.

EXAMPLE 3

A heat pipe was prepared under the same conditions as in Example 1 with the exception of using a working liquid prepared by admixing ammonium metavanadate to pure water and having an adjusted pH of 8. The heat pipe was checked for performance under the same conditions as in Example 1. Consequently, the temperature difference ($\Delta T$) after lapse of 2000 hours was about 0° C.

COMPARATIVE EXAMPLE

A heat pipe container was prepared in the same manner as in Example 1. Subsequently, an aqueous solution of sodium metavanadate, 0.5 wt. % in concentration, was injected into the container through the nozzle to fill 25% of the entire interior volume of the container. With a valve mounted on the nozzle, the container was then heated to deaerate the interior by driving out vapor, and the valve was thereafter closed. The container was uniformly heated in its entirety at 300° C. for 1 hour, and the valve was opened to partly draw off the sodium metavanadate solution from the container, leaving the solution in such an amount as to fill 14% of the entire interior volume of the container for the solution to serve as a working liquid. The working liquid had a pH of 7.8. In this way, a heat pipe was prepared. The pipe was checked for performance in the same manner as in Example 1. Consequently, the temperature difference ($\Delta T$) after lapse of 2000 hours was found to be about 100 to about 200° C.

What is claimed is:

1. A process for producing a heat pipe comprising the steps of treating the inner surface of a steel container with an aqueous solution of a vanadate with heating to form a protective layer over the container inner surface, drawing off the aqueous solution of said vanadate, and enclosing in the container a working liquid prepared by adding an alkalinizing pH adjusting agent free from any alkali metal or alkaline earth metal to pure water and having an adjusted pH of 8 to 12.

2. A process as defined in claim 1 wherein the alkalinizing pH adjusting agent is a compound selected from the group consisting of hydrazine, ammonia and amine compounds.

3. A process as defined in claim 2 wherein said amine compound is morpholine or triethanolamine.

4. A process as defined in claim 1 wherein the alkalinizing pH adjusting agent is hydrazine.

5. A process as defined in claim 1 wherein the working liquid has a pH of 8.5 to 10.5.

6. A process as defined in claim 1 wherein the container inner surface is further subjected to anti-corrosive treatment with hydrogen peroxide before enclosing the working liquid after the protective layer has been formed and the aqueous solution of a vanadate has been drawn off from the container.

7. A process as defined in claim 6, wherein the hydrogen peroxide is in the form of an aqueous solution of hydrogen peroxide having a concentration of 0.1 to 34 wt. %.

8. A heat pipe produced by the process of claim 6.

9. A heat pipe produced by the process of claim 1.

* * * * *